(12) United States Patent
Jung

(10) Patent No.: US 9,985,559 B2
(45) Date of Patent: May 29, 2018

(54) CONTROL APPARATUS FOR ROTATING MACHINE

(71) Applicant: DENSO CORPORATION, Kariya, Aichi-pref. (JP)

(72) Inventor: Sukhwa Jung, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days. days.

(21) Appl. No.: 15/596,334

(22) Filed: May 16, 2017

(65) Prior Publication Data

US 2017/0338756 A1 Nov. 23, 2017

(30) Foreign Application Priority Data

May 17, 2016 (JP) ................... 2016-098677

(51) Int. Cl.

| G05B 11/01 | (2006.01) |
|---|---|
| H02P 6/18 | (2016.01) |
| H02K 21/14 | (2006.01) |
| H02P 23/14 | (2006.01) |

(52) U.S. Cl.
CPC ............... *H02P 6/18* (2013.01); *H02K 21/14* (2013.01); *H02P 23/14* (2013.01)

(58) Field of Classification Search
CPC ........ G05D 3/1418; G05D 3/121; G05B 5/01; G05B 19/404; G05B 19/19; G05B 19/33; G01R 17/02; G01R 19/10
USPC ................................. 318/629, 632
See application file for complete search history.

(56) References Cited

U.S. PATENT DOCUMENTS

| 5,448,149 A * | 9/1995 | Ehsani | .................... | H02P 1/163 |
| | | | | 318/400.01 |
| 6,396,229 B1 | 5/2002 | Sakamoto et al. | | |
| 7,429,840 B2 * | 9/2008 | Pollock | .................. | H02P 6/182 |
| | | | | 310/168 |
| 2008/0116770 A1* | 5/2008 | Lewis | ..................... | H02P 25/18 |
| | | | | 310/68 D |
| 2009/0212564 A1* | 8/2009 | Yang | ....................... | H02P 9/009 |
| | | | | 290/44 |

(Continued)

FOREIGN PATENT DOCUMENTS

| JP | 2002-078391 A | 3/2002 |
| JP | 2007-151344 A | 6/2007 |
| JP | 2010-154598 A | 7/2010 |

*Primary Examiner* — Rina Duda
(74) *Attorney, Agent, or Firm* — Oliff PLC

(57) ABSTRACT

A control apparatus controls a rotating machine including a stator having groups of phase windings, to control current application to the groups. The control apparatus includes power converters converting received power to AC power and supplying the AC power to the rotating machine, a harmonic component cancellation section reducing a harmonic component superimposed on a fundamental wave component by a cancellation process in an estimated-rotating coordinate system for at least one of voltage and current of each system, when a unit of a group of components controlling current application to a specific group of the windings is defined as a system, an induced voltage estimation section estimating an induced voltage based on information common to the systems including a voltage value and a current value calculated by the cancellation process, and a magnetic-pole-position estimation section estimating a magnetic pole position of a rotor based on the estimated induced voltage.

5 Claims, 10 Drawing Sheets

(56) References Cited

U.S. PATENT DOCUMENTS

| | | | |
|---|---|---|---|
| 2011/0101906 A1 | 5/2011 | Tagome | |
| 2012/0249024 A1* | 10/2012 | Saha | H02P 21/06 318/400.02 |
| 2013/0285591 A1* | 10/2013 | Suzuki | H02P 25/22 318/724 |
| 2014/0207335 A1 | 7/2014 | Mikamo et al. | |

* cited by examiner

ADDITION OF FIFTH HARMONIC

ADDITION OF SEVENTH HARMONIC

US 9,985,559 B2

1

CONTROL APPARATUS FOR ROTATING MACHINE

CROSS-REFERENCE TO RELATED APPLICATION

This application is based on and claims the benefit of priority from earlier Japanese Patent Application No. 2016-98677 filed May 17 2016, the description of which is incorporated herein by reference.

BACKGROUND

Technical Field

The present invention relates to a control apparatus for a rotating machine. The control apparatus performs sensorless position control.

Related Art

Conventionally, a control apparatus is known which drives a multiple-winding synchronous rotating machine by using a plurality of inverters, and which performs sensorless position control estimating a position of a magnetic pole from voltage or current information.

For example, a sensorless position control apparatus for a synchronous machine disclosed in Japanese Patent No. 5527025 calculates estimated phase angles individually by using a master inverter and a slave inverter, and thereafter calculates an estimated speed based on the average of the estimated phase angles.

The control apparatus in Japanese Patent No. 5527025 has a problem that since an extended induced voltage and an estimated phase angle are individually calculated by using the two inverters, the amount of calculation increases.

In addition, it is known that, during the control of a multiphase AC motor, harmonic components are superimposed on a fundamental wave component of a phase current due to magnetizing nonuniformity of a rotor magnet, shapes or the like of a rotor and a stator, or a disturbance. Pulsations of the harmonic components may lower the accuracy in position estimation. However, Japanese Patent No. 5527025 does not at all describe reduction of such harmonic components.

SUMMARY

An embodiment provides a control apparatus for a rotating machine having a plurality of groups of multiple phase windings. For the rotating machine, the control apparatus appropriately reduces harmonic components while reducing the amount of calculation of position estimation in sensorless position control.

As an aspect of the embodiment, a control apparatus for a rotating machine is provided. The control apparatus controls the rotating machine that includes a stator having a plurality of groups of three phases or more multiple phase windings, to control current application to the groups of windings by using sensorless position control. The control apparatus includes: a plurality of power converters that convert received electric power to AC power and supply the AC power to the rotating machine; a harmonic component cancellation section that reduces a harmonic component superimposed on a fundamental wave component by a cancellation process in an estimated rotating coordinate system for at least one of a voltage and a current of each

2 system, when a unit of a group of components controlling current application to a specific group of the windings is defined as a system; an induced voltage estimation section that estimates an induced voltage based on information common to the systems including a voltage value and a current value calculated by the cancellation process; and a magnetic pole position estimation section that estimates a magnetic pole position of a rotor of the rotating machine based on the induced voltage estimated by the induced voltage estimation section.

DETAILED DESCRIPTION OF THE PREFERRED EMBODIMENTS

Figure 1:
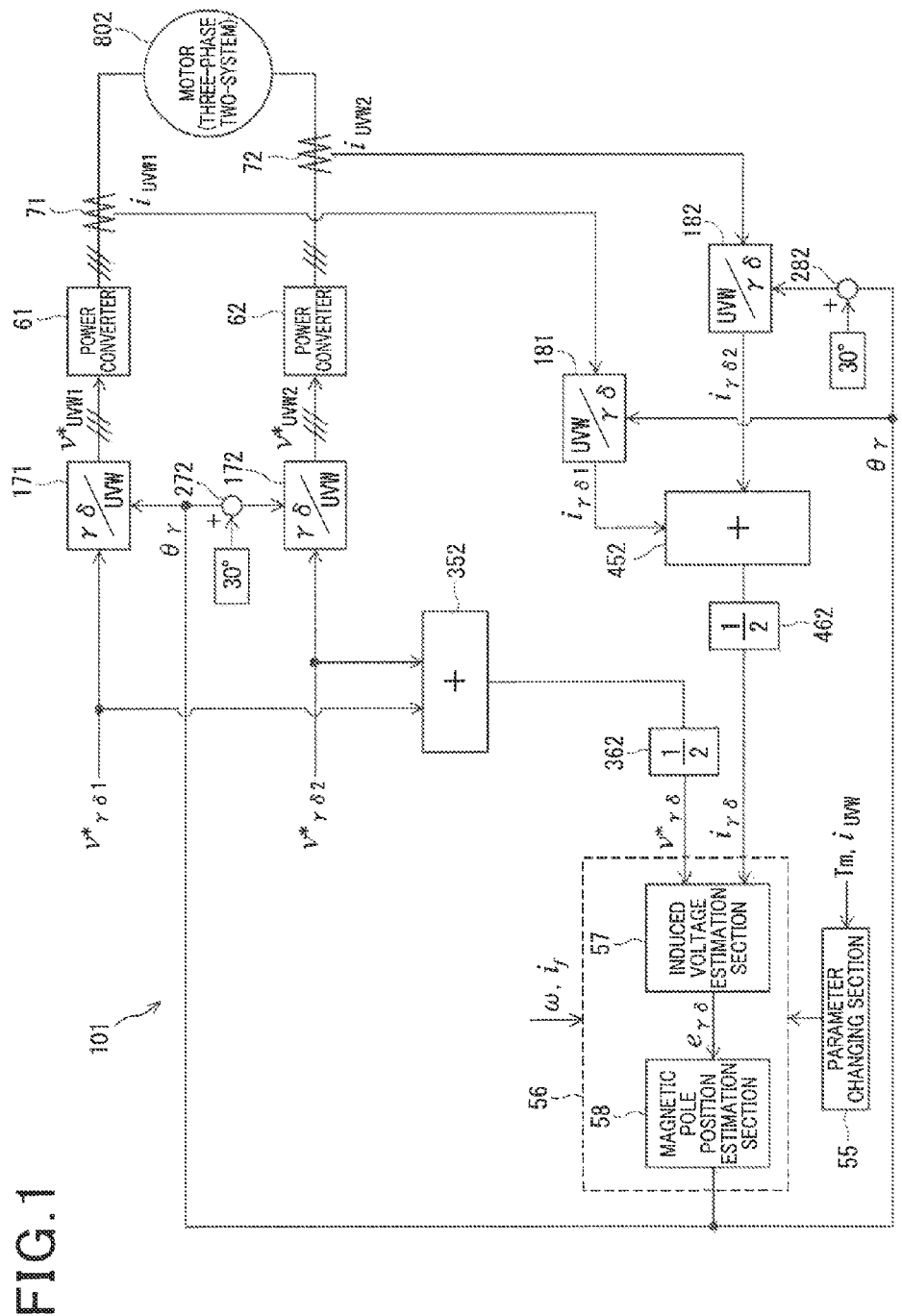
FIG. 1 is a control block diagram showing a configuration of a control apparatus for a rotating machine according to a first embodiment.

Hereinafter, embodiments of a control apparatus for a rotating machine will be described with reference to the drawings. In the embodiments, the substantially same parts will be denoted by the same reference numerals, and descriptions thereof will be omitted. In principle, the matters described in the former embodiment will be applied to the later embodiments in common unless otherwise stated.

The control apparatus for a rotating machine is applied to, for example, a system controlling current application to an ISG (Integrated Starter Generator), in which functions of a starter and an alternator are integrated, in a vehicle including an engine serving as a driving source.

In the following embodiments, the rotating machine corresponds to a motor, and the control apparatus for a rotating machine corresponds to a motor control apparatus. In addition, the first to fourth embodiments are inclusively referred to as the present embodiment.

Motor control apparatus of the embodiments control a motor that includes a stator having a plurality of groups of three phases or more multiple phase windings, to control current application from a plurality of power converters to the corresponding group of windings. Hereinafter, a unit of a group of components controlling current application to a specific group of windings is defined as a system (line). Specifically, the number of phases of each of the motors of the first to fourth embodiments is three. The number of systems is as follows: the first and second embodiments use 2 systems, the third embodiment uses 3 systems, the fourth embodiment uses generalized N systems. Assuming such configurations, the motor control apparatus of each of the embodiments performs sensorless position control to control output voltage of the power converter of the corresponding systems.

Reference numeral of a motor control apparatus of each of the embodiments is 10 followed by the number of the embodiment. Reference numeral of a motor of each of the embodiments is 80 followed by 2 in a case of two systems, followed by 3 in a case of three systems, or followed by 9 in a case of N systems. Similarly, reference numerals of voltage adders, current adders, and dividers, which serve as a harmonic component cancellation section, are followed by 2, 3, or 9 according to the number of systems.

Power converters, current sensors, and the like, which are components of the systems have double digit or triple digit reference numerals whose last number is the number of the systems. For example, the last number of the reference numeral of the component of the first system is 1, the last number of the reference numeral of the component of the second system is 2, and the last number of the reference numeral of the component of the Nth system is 9.

First Embodiment

A three-phase and two-system motor control apparatus according to the first embodiment will be described with reference to FIG. 1 to FIG. 6. As shown in FIG. 1, a motor control apparatus 101 is applied to a system in which AC power is supplied from two power converters 61 and 62 to a motor 802 having groups of three-phase windings of two systems (two groups of three-phase windings).

The motor 802 is, for example, a permanent magnet synchronous three-phase AC motor. The motor 802 is not provided with a rotation angle sensor detecting a position of a magnetic pole (magnetic pole position) of a rotor.

Figure 2A:
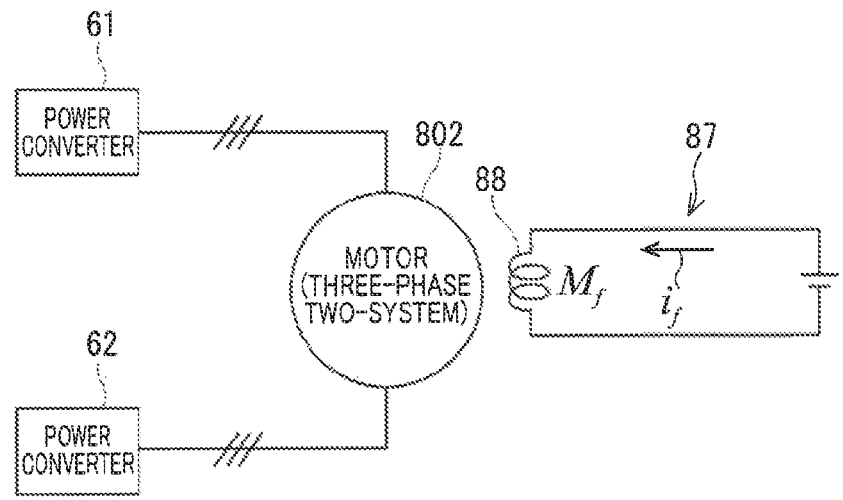
FIG. 2A is a schematic diagram of a field circuit.

As shown in FIG. 2A, in the vicinity of the motor 802, a field circuit 87 is provided which has a field winding 88 having inductance Mf and through which a field current if flows. Note that a controller controlling the field current if is not shown.

Figure 2B:
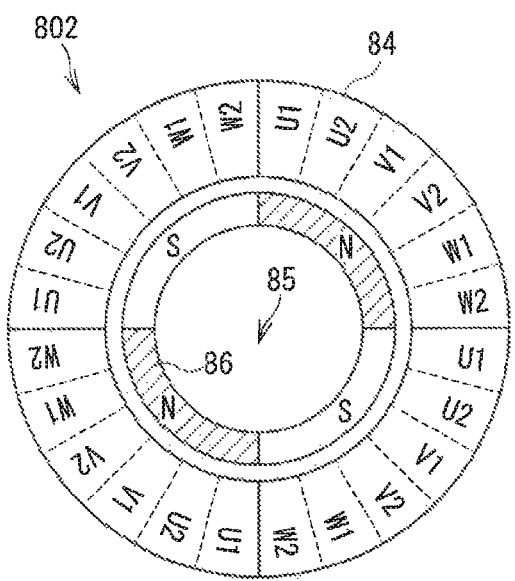
FIG. 2B is a partial cross-sectional view of a stator of a two-system rotating machine.

As shown in FIG. 2B, in the permanent magnet synchronous motor 802, a rotor 85 in which magnetic poles 86 are arranged in the circumferential direction is rotatably supported inside of and in the radial direction of a stator 84. FIG. 2B shows an example in which two pairs of an N pole and an S pole (i.e. a total of four poles) are provided in the rotor 85.

Regarding the windings wound around the stator 84, for example, U1 indicates a U-phase winding of a first system, and V2 indicates a V-phase winding of a second system. In-phase coils of the first system and the second system are alternately arranged in the circumferential direction of the stator 84.

Figure 3:
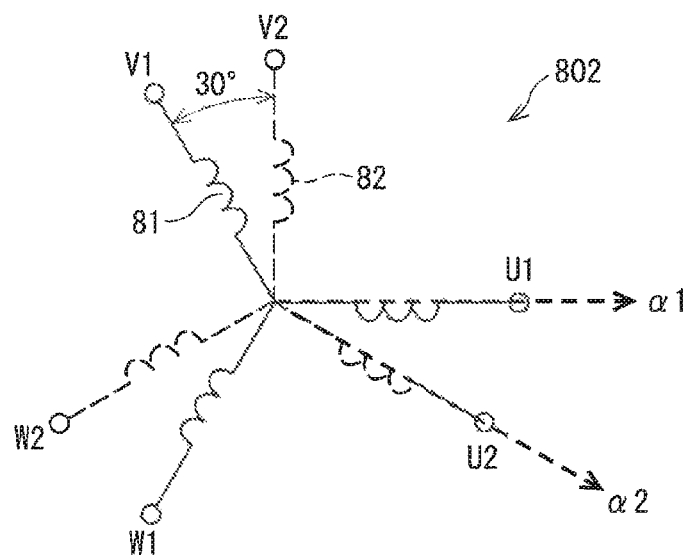
FIG. 3 is a schematic diagram of windings of a three-phase two-system rotating machine.

FIG. 3 shows first system windings 81 with solid lines and second system windings 82 with broken lines to schematically show an arrangement of the windings of the three-phase and two-system motor 802. Phases of the phase windings of the three-phase and two-system motor 802 between the first system and the second system are displaced from each other at an electrical angle of 30 (i.e. 60/2)°.

In addition, $\alpha\beta2$ axes of a two-phase fixed coordinate system are defined so that $\alpha$ axes $\alpha1$ and $\alpha2$ agree with U-phase axes U1 and U2.

Returning to FIG. 1, the power converters 61, 62 of the first and second systems respectively correspond to the first system winding 81 and the second system winding 82. Sets of three oblique lines added to oblique line signal lines and output side power paths of the power converters 61, 62 indicate three phases. Typically, the power converters 61, 62 are inverters that convert DC power received from a DC power supply such as a battery to AC power by operations of a plurality of switching elements.

FIG. 1 does not show input side power paths of the power converters 61, 62. DCDC converters or the like may be provided between the DC power supply and the power converters 61, 62.

In addition, since the configuration of a three-phase inverter including six switching elements of three-phase upper and lower arms is also known, it is not shown.

Triangular wave symbols shown on the power paths between the power converters 61, 62 and the motor 802 indicate current sensors 71, 72 that detect phase currents of the respective systems. The current sensors 71, 72 may be provided to all the three phases. Alternatively, the current sensors 71, 72 may be provided to two of the three phases, and a current of the remaining one phase may be calculated by Kirchhoff's law.

Figure 4:
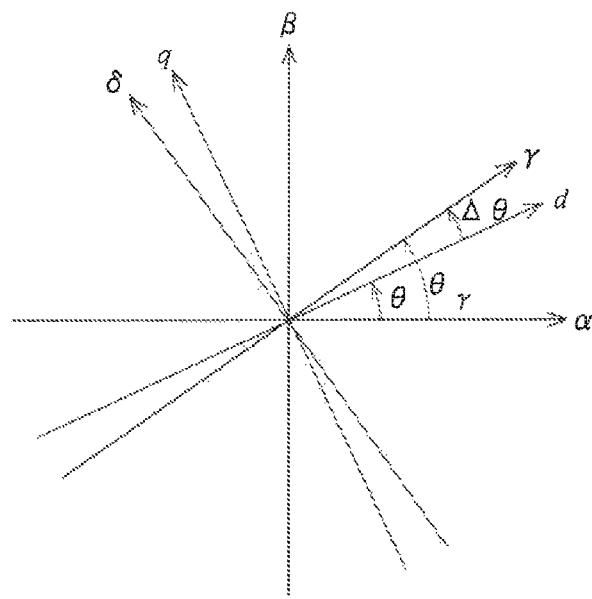
FIG. 4 is a diagram illustrating a relationship among axes of a fixed coordinate system, a rotating coordinate system, and an estimated rotating coordinate system.

The motor control apparatus 101 has a basic configuration for vector control using sensorless position control, which is a known technique disclosed in, for example, Japanese Patent No. 3411878. The relationship among axes of coordinate systems used in the vector control is shown in FIG. 4. The $\alpha\beta$ axes are orthogonal to each other in a two-phase fixed coordinate system. The dq axes are orthogonal to each other in a two-phase rotating coordinate system. Due to the rotation of the rotor 85, an electrical angle $\theta$, that is, phases of the dq axes with respect to the $\alpha\beta2$ axes change with time.

In the sensorless position control that does not directly detect an actual electrical angle $\theta$, $\gamma\delta$ axes of a two-phase estimation rotating coordinate system are defined in addition to the dq axes. The difference between an estimated magnetic pole position $\theta\gamma$ on the $\gamma\delta$ axes and the actual electrical angle $\theta$ is indicated by axis displacement $\Delta\theta$. Under the sensorless position control, an electrical angular velocity $\omega$ is calculated by PI control or the like so that the axis displacement $\Delta\theta$ converges on 0. Thereby, control operation is performed assuming that the estimated magnetic pole position $\theta\gamma$ is an actual electrical angle $\theta$.

Herein and in the drawings, sign $i_{\gamma\delta}$ indicates a $\gamma$ axis current $i_\gamma$ and a $\delta$ axis current $i_\delta$. In the expressions, the $\gamma$ axis current $i_\gamma$ and the $\delta$ axis current $i_\delta$ are individually shown in matrix forms. These are common in $V_{\gamma\delta}$ and $e_{\gamma\delta}$. It is noted that, in $\theta\gamma$, the ordinary letter of $\gamma$ is used instead of the inferior letter of $\gamma$.

Returning to FIG. 1, the motor control apparatus 101 of the present embodiment is characterized by controlling current application to the motor 802 having groups of three-phase windings of two systems (two groups of three-phase windings) by using the sensorless position control. It is assumed that any known technique can be applied to the configuration for calculating γδ axes voltage command values $v^*_{\gamma\delta1}$ and $v^*_{\gamma\delta2}$ of two systems. Thus, this configuration is not shown. For example, the γδ axes voltage command value $v^*_{\gamma\delta1}$ and $v^*_{\gamma\delta2}$ may be calculated by current feedback control for making a detected actual current agree with a current command value. Alternatively, the γδ axes voltage command value $v^*_{\gamma\delta1}$ and $v^*_{\gamma\delta2}$ may be calculated by torque feedback control for making detected actual torque or estimation torque estimated from an actual current agree with a torque command value.

The motor control apparatus 101 includes a two-phase three-phase converter 171 and a three-phase two-phase converter 181 of the first system, a two-phase three-phase converter 172 and a three-phase two-phase converter 182 of the second system, a voltage adder 352, a divider 362, a current adder 452, a divider 462, a parameter changing section 55, an induced voltage estimation section 57, and a magnetic pole position estimation section 58.

The voltage adder 352 and the current adder 452 correspond to a harmonic component cancellation section, and perform a cancellation process in which voltages and currents of the two systems are added in the estimated rotating coordinate system to cancel harmonic components superimposed on a fundamental harmonic component.

Alternatively, a set of the combination of the voltage adder 352 and the divider 362 and the combination of the current adder 452 and the divider 462 may be assumed to be a harmonic component cancellation section and may be interpreted to calculate average values of voltages and currents of the two systems in the estimated rotating coordinate system to perform the cancellation process.

The two-phase three-phase converters 171, 172 of the respective systems convert γδ axes voltage command values $v^*_{\gamma\delta1}$ and $v^*_{\gamma\delta2}$ to three-phase voltage command values $v^*_{UVW1}$ and $v^*_{VW2}$ output the three-phase voltage command values $v^*_{UVW1}$ and $v^*_{VW2}$ to the power converters 61, 62. The three-phase two-phase converters 181, 182 of the respective systems obtain phase currents $i_{UVW1}$ and $i_{VW2}$ detected by current sensors 71, 72 and convert the phase currents $i_{UVW1}$ and $i_{UVW2}$ to γδ axes current detection values $i_{\gamma\delta1}$ and $i_{\gamma\delta2}$.

The voltage adder 352 calculates the sum of the γδ axes voltage command values $v^*_{\gamma\delta1}$ and $v^*_{\gamma\delta2}$ of the two systems. The divider 362 outputs an average value $v^*_{\gamma\delta}$ obtained by dividing the sum by 2 to the induced voltage estimation section 57.

The current adder 452 calculates the sum of the γδ axes current detection values $i_{\gamma\delta1}$ and $i_{\gamma\delta2}$ of the two systems. The divider 462 outputs an average value $i_{\gamma\delta}$ obtained by dividing the sum by 2 to the induced voltage estimation section 57.

The induced voltage estimation section 57 estimates an extended induced voltage $e_{\gamma\delta}$ based on the average value $v^*_{\gamma\delta}$ of the voltage command values and average value $i_{\gamma\delta}$ of the current detection values, which are information common to the systems.

The magnetic pole position estimation section 58 calculates functions of the axis displacement Δθ, −sin Δθ and cos Δθ, based on the extended induced voltage $e_{\gamma\delta}$ and further estimates the estimated magnetic pole position θγ by PI control operation making the axis displacement Δθ converge to 0, or the like. Typically, the electrical angular velocity ω is estimated while the magnetic pole position θγ is estimated. That is, the magnetic pole position estimation section functions as a magnetic pole position and speed estimation section exactly.

Expressions for estimation calculation by the induced voltage estimation section 57 and the magnetic pole position estimation section 58 are described below.

Signs are indicated as below. Indexes 1 and 2 of the signs indicate values of the first system and the second system.
R: resistance
$L_d$, $L_q$: d axis, q axis self inductance
$M_d$, $M_q$: d axis, q axis mutual inductance
ω: electrical angular velocity
$M_f$: inductance of field circuit
$i_f$: field current A voltage equation of the estimated rotating coordinate system of the first system and an extended induced voltage $e_{\gamma\delta1}$ are expressed by the following expression 1.

$$\begin{bmatrix} v_{\gamma1} \\ v_{\delta1} \end{bmatrix} = \begin{bmatrix} R+pL_{d1} & -\omega L_{q1} \\ \omega L_{q1} & R+pL_{d1} \end{bmatrix} \begin{bmatrix} i_{\gamma1} \\ i_{\delta1} \end{bmatrix} + \qquad \text{[Expression 1]}$$

$$\begin{bmatrix} pM_d & -\omega M_q \\ \omega M_q & pM_d \end{bmatrix} \begin{bmatrix} i_{\gamma2} \\ i_{\delta2} \end{bmatrix} + \begin{bmatrix} e_{\gamma1} \\ e_{\delta1} \end{bmatrix}$$

$$\begin{bmatrix} e_{\gamma1} \\ e_{\delta1} \end{bmatrix} = [(L_{d1}-L_{q1})(\omega i_{d1} - \dot{i}_{q1}) + (M_d - M_q)(\omega i_{d2} - \dot{i}_{q2}) +$$

$$\omega M_f i_f] \begin{bmatrix} -\sin\Delta\theta \\ \cos\Delta\theta \end{bmatrix}$$

A voltage equation of the estimated rotating coordinate system of the second system and an extended induced voltage $e_{\gamma\delta2}$ are expressed by the following expression 2.

$$\begin{bmatrix} v_{\gamma1} \\ v_{\delta1} \end{bmatrix} = \begin{bmatrix} R+pL_{d2} & -\omega L_{q2} \\ \omega L_{q2} & R+pL_{d2} \end{bmatrix} \begin{bmatrix} i_{\gamma2} \\ i_{\delta2} \end{bmatrix} + \qquad \text{[Expression 2]}$$

$$\begin{bmatrix} pM_d & -\omega M_q \\ \omega M_q & pM_d \end{bmatrix} \begin{bmatrix} i_{\gamma1} \\ i_{\delta1} \end{bmatrix} + \begin{bmatrix} e_{\gamma2} \\ e_{\delta2} \end{bmatrix}$$

$$\begin{bmatrix} e_{\gamma2} \\ e_{\delta2} \end{bmatrix} = [(L_{d2}-L_{q2})(\omega i_{d2} - \dot{i}_{q2}) +$$

$$(M_d - M_q)(\omega i_{d1} - \dot{i}_{q1})\omega M_f i_f] \begin{bmatrix} -\sin\Delta\theta \\ \cos\Delta\theta \end{bmatrix}$$

Average values of voltages, currents, and extended induced voltages of the first system and the second system are defined by the following expression 3.

$$v_\gamma = \frac{v_{\gamma1}+v_{\gamma2}}{2}, v_\delta = \frac{v_{\delta1}+v_{\delta2}}{2} \qquad \text{[Expression 3]}$$

$$i_\gamma = \frac{i_{\gamma1}+i_{\gamma2}}{2}, i_\delta = \frac{i_{\delta1}+i_{\delta2}}{2}$$

$$e_\gamma = \frac{e_{\gamma1}+e_{\gamma2}}{2}, e_\delta = \frac{e_{\delta1}+e_{\delta2}}{2}$$

In addition, it is assumed that self inductances of the two systems establish the relationships in the following expression 4.

$$L_{d1}=L_{d2}=L_d, L_{q1}=L_{q2}=L_q \qquad \text{[Expression 4]}$$

A voltage equation using voltage and current average values of the two systems and extended induced voltages $e_{\gamma\delta 0}$ are expressed by the following expression 5.

$$\begin{bmatrix} v_\gamma \\ v_\delta \end{bmatrix} = \begin{bmatrix} R + p(L_d + M_d) & -\omega(L_q + M_q) \\ \omega(L_q + M_q) & R + p(L_d + M_d) \end{bmatrix} \begin{bmatrix} i_\gamma \\ i_\delta \end{bmatrix} + \begin{bmatrix} e_\gamma \\ e_\delta \end{bmatrix} \quad \text{[Expression 5]}$$

$$\begin{bmatrix} e_\gamma \\ e_\delta \end{bmatrix} = [(L_d + M_d - L_q - M_q)(\omega i_d - \dot{i}_q)\} + \omega M_f i_f]$$

$$\begin{bmatrix} -\sin\Delta\theta \\ \cos\Delta\theta \end{bmatrix}$$

The axis displacement $\Delta\theta$ is calculated by the following expression 6 based on $-\sin\Delta\theta$ and $\cos\Delta\theta$ obtained from the expressions 1, 2, and 5.

$$\Delta\theta = \tan^{-1}\frac{\sin\Delta\theta}{\cos\Delta\theta} \quad \text{[Expression 6]}$$

In FIG. 1, the induced voltage estimation section 57 and the magnetic pole position estimation section 58 are collectively referred to as an estimation section 56. The estimation section 56 receives the electrical angular velocity $\omega$ and the field current if, which vary depending on an operating state of the motor 802. It is noted that according to the configuration in which the electrical angular velocity $\omega$ is estimated inside the magnetic pole position estimation section 58, the arrow indicating input of the electrical angular velocity $\omega$ is not necessarily required but is shown as input information for the sake of convenience.

In addition, resistance R and inductances L, M, which are parameters of the motor 802, may be stored as fixed values.

Figure 5A:
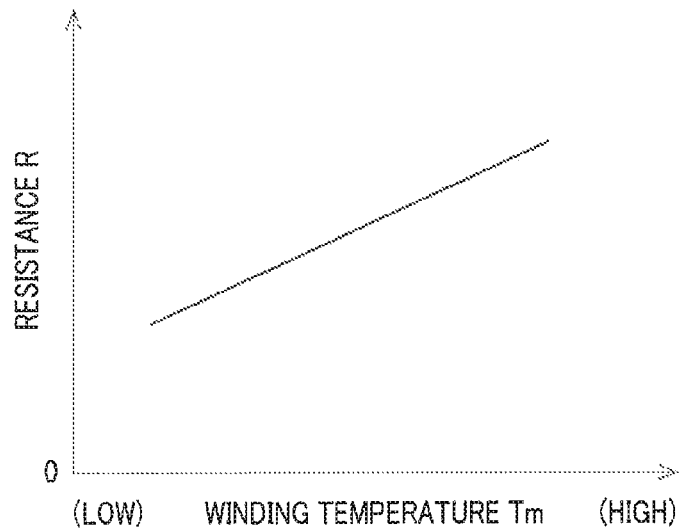
FIG. 5A is a characteristic diagram showing a relationship between winding temperature and resistance.
Figure 5B:
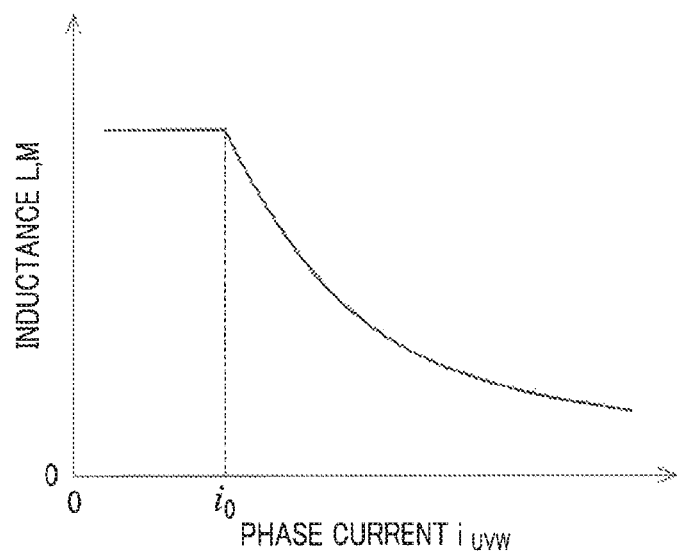
FIG. 5B is a characteristic diagram showing a relationship between current and inductance.

It is noted that, for example, as shown in FIG. 5A, the resistance R has a positive correlation with winding temperature Tm. In addition, as shown in FIG. 5B, the inductances L, M have an inversely proportional type negative correlation with respect to the phase current $i_{UVW}$. It is noted that the region equal to or less than a critical current $i_0$ corresponds to a magnetic saturation region.

Hence, the motor control apparatus 101 according to the first embodiment includes the parameter changing section 55 that changes a parameter value of the motor 802 depending on operating states of the motor 802, such as the winding temperature Tm and the phase current $i_{UVW}$. The parameter changing section 55 may store characteristics maps shown in FIGS. 5A and 5B, and may calculate parameter values from expressions.

The estimation section 56 performs estimation calculation of the extended induced voltages $e_\gamma$ and $e_\delta$ and the axis displacement $\Delta\theta$ by using parameter values appropriately changed by the parameter changing section 55. Thereby, the accuracy in estimating a position can be ensured depending on the operating state of the motor 802, regardless of magnetic saturation, temperature change, and the like.

It is note that the parameter changing section 55 may directly obtain the winding temperature Tm from a temperature sensor provided to the motor 802. Alternatively, the winding temperature Tm may be estimated based on information such as a temperature of another portion and the phase currents $i_{UVW}$.

In addition, for example, the time constant of change of the winding temperature Tm is much longer than a control operation cycle. Hence, the parameter changing section 55 may set the cycle of changing the value of the resistance R, for example, once every few hundred to few thousand times of the control cycle or once every few seconds to reduce the amount of calculation.

As described above, the magnetic pole position estimation section 58 estimates the magnetic pole position $\theta\gamma$. The magnetic pole position $\theta\gamma$ indicates, for example, a magnetic pole position of the first system by the definition of the origin of the axis. The magnetic pole position of the second system is indicated by adding a predetermined phase difference with reference to the magnetic pole position of the first system. Hence, the magnetic pole position $\theta\gamma$ estimated by the magnetic pole position estimation section 58 is appropriately referred to as reference magnetic pole position $\theta\gamma$.

The reference magnetic pole position $\theta\gamma$ calculated by the magnetic pole position estimation section 58 is transmitted to the two-phase three-phase converters 171, 172 and the three-phase two-phase converters 181, 182.

At this time, the two-phase three-phase converter 171 and the three-phase two-phase converter 181 of the first system receive the reference magnetic pole position $\theta\gamma$. The two-phase three-phase converter 172 and the three-phase two-phase converter 182 of the second system receive information on a position obtained by adding an electrical angle of 30° to the reference magnetic pole position $\theta\gamma$ by angle adders 272, 282. The two-phase three-phase converters 171, 172 and the three-phase two-phase converters 181, 182 of the respective systems perform coordinate conversion calculation by using the received position information.

Meanwhile, it is known that, for example, fifth, seventh, eleventh, and thirteenth harmonic components, that is, (6 k±1)-th (k is a natural number) harmonic components are typically superimposed on first components of the three-phase currents $i_{UVW1}$ and $i_{VW2}$ detected by the current sensors 71, 72. The harmonic components are generated by, for example, a structural factor due to magnetizing nonuniformity of a rotor magnet of an IPM motor or shapes of the rotor and the stator, or disturbance caused while the motor is operating. The (6 k±1)-th component superimposed on a first component of the three-phase current becomes a (6 k)-th component, such as sixth and twelfth components, superimposed on a zeroth component (i.e. DC component) of a $\gamma\delta$ axes current by coordinate conversion.

The present embodiment mainly focuses on a case of k=1, that is, a sixth component superimposed on a zeroth component of a $\gamma\delta$ axes current, the sixth components appearing when fifth and seventh components superimposed on a first component of a phase current are converted in a rotating coordinate system. Effects of the sixth component are similarly applicable to, for example, eighteenth and thirtieth components corresponding to a case where k is an odd number.

First, as a comparative example, variations in harmonic components in a case where currents of two systems, between which phases are displaced from each other at an electrical angle of 30° on the $\alpha\beta$ axes of a two-phase fixed coordinate system, are added, are described with reference to FIG. 12.

When fifth and seventh harmonic components are superimposed on an $\alpha$ axis current $i_{\alpha 1}$ and a $\beta$ axis current $i_{\beta 1}$ of the first system and an $\alpha$ axis current $i_{\alpha 2}$ and a $\beta$ axis current $i_{\beta 2}$ of the second system in the $\alpha\beta$ axes of the fixed coordinate system, the $\alpha$ axis current $i_{\alpha 1}$, the $\beta$ axis current $i_{\beta 1}$, the $\alpha$ axis current $i_{\alpha 2}$, and the $\beta$ axis current $i_{\beta 2}$ are expressed by the expression 7.

$$\begin{bmatrix} i_{\alpha 1} \\ i_{\beta 1} \end{bmatrix} = \qquad \text{[Expression 7]}$$

$$\begin{bmatrix} i_{\alpha 1\_1st} + |i_{\alpha 1\_5th}|\sin 5(\theta + \theta_{\alpha 1}) + |i_{\alpha 1\_7th}|\sin 7(\theta + \theta_{\alpha 1}) \\ i_{\beta 1\_1st} + |i_{\beta 1\_5th}|\cos 5(\theta + \theta_{\beta 1}) + |i_{\beta 1\_7th}|\cos 7(\theta + \theta_{\beta 1}) \end{bmatrix}$$

$$\begin{bmatrix} i_{\alpha 2} \\ i_{\beta 2} \end{bmatrix} = \begin{bmatrix} i_{\alpha 2\_1st} + |i_{\alpha 2\_5th}|\sin 5\left(\theta + \theta_{\alpha 2} + \frac{\pi}{6}\right) + \\ |i_{\alpha 2\_7th}|\sin 7\left(\theta + \theta_{\alpha 2} + \frac{\pi}{6}\right) \\ i_{\beta 2\_1st} + |i_{\beta 2\_5th}|\cos 5\left(\theta + \theta_{\beta 2} + \frac{\pi}{6}\right) + \\ |i_{\beta 2\_7th}|\cos 7\left(\theta + \theta_{\beta 2} + \frac{\pi}{6}\right) \end{bmatrix}$$

Figure 12A:
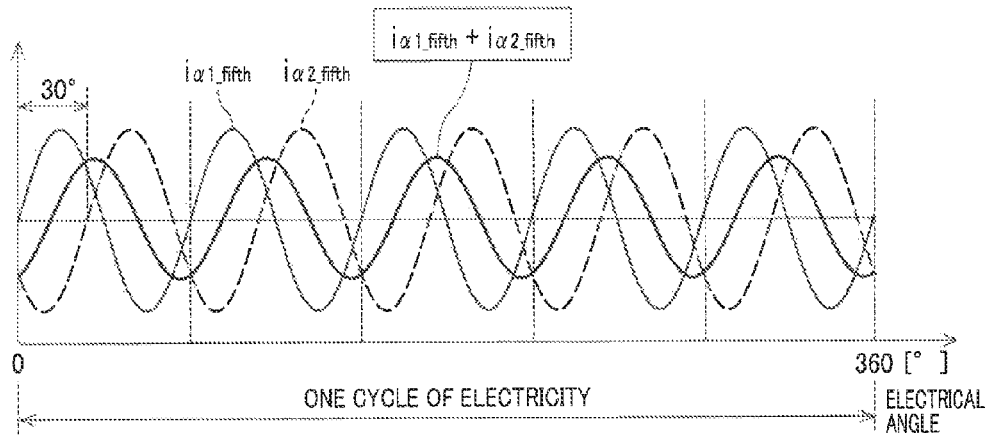
FIG. 12A illustrates the addition of a fifth harmonic in a three-phase two-system fixed coordinate system (comparative example)
Figure 12B:
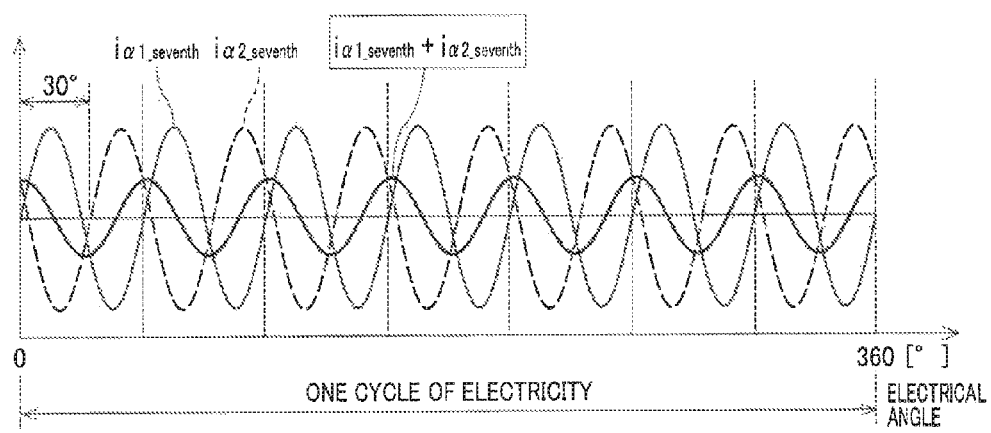
FIG. 12B illustrates the addition of a seventh harmonic in the three-phase two-system fixed coordinate system (comparative example).

As shown in FIG. 12A, when fifth harmonic components $i_{\alpha 1\_fifth}$ and $i_{\alpha 2\_fifth}$ of the α axis currents of the two systems are added in the fixed coordinate system, although the amplitudes become small, the fifth harmonic components whose phase are displaced from each other remain. As shown in FIG. 12B, when seventh harmonic components $i_{\alpha 1\_seventh}$ and $i_{\alpha 2\_seventh}$ of the α axis currents of the two systems are added in the fixed coordinate system, similar phenomena occur. That is, even when values of the two systems are added in the fixed coordinate system, harmonic components cannot be canceled.

For example, Japanese Patent Application Laid-Open No. 2014-138530 discloses a technique in which an induced voltage and an electrical angle are calculated based on a voltage vector and a current vector of the two systems added in the two-phase fixed coordinate system.

However, as described above, even when values of the two systems are added in the fixed coordinate system, harmonic components are not canceled. Thus, variation is caused in an estimated electrical angle. In addition, since a fundamental wave component of the fixed coordinate system is an alternating quantity, a discretization error in the microcomputer process becomes significant as the number of rotations increases. As a result, the error in the estimated electrical angle becomes large.

Hence, in the present embodiment, voltage values or current values of the systems are added in the estimated rotating coordinate system, and the obtained value is divided by the number of systems to obtain an average value. Then, the induced voltage $e_{\gamma\delta}$ is calculated by using the average value of the systems to estimate a position of a magnetic pole.

Specifically, a case is described where a sixth harmonic component is superimposed on a zeroth component (i.e. DC component) in the rotating coordinate system. The γδ axes currents $i_{\gamma\delta 1}$ and $i_{\gamma\delta 2}$ of the two systems in which the sixth harmonic component is superimposed on the zeroth component are expressed by the expression 8.

$$\begin{bmatrix} i_{\gamma 1} \\ i_{\delta 1} \end{bmatrix} = \begin{bmatrix} i_{\gamma 1\_0th} + |i_{\gamma 1\_6th}|\sin 6(\theta + \theta_{\gamma 1}) \\ i_{\delta 1\_0th} + |i_{\delta 1\_6th}|\cos 6(\theta + \theta_{\delta 1})^5 \end{bmatrix} \qquad \text{[Expression 8]}$$

$$\begin{bmatrix} i_{\gamma 2} \\ i_{\delta 2} \end{bmatrix} = \begin{bmatrix} i_{\gamma 2\_0th} + |i_{\gamma 2\_6th}|\sin 6\left(\theta + \theta_{\gamma 2} + \frac{\pi}{6}\right) \\ i_{\delta 2\_0th} + |i_{\delta 2\_6th}|\cos 6\left(\theta + \theta_{\delta 2} + \frac{\pi}{6}\right) \end{bmatrix}$$

Figure 6:
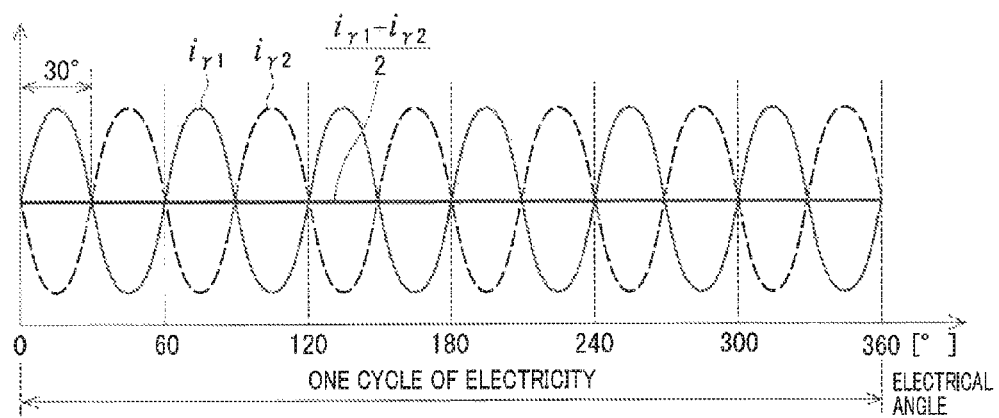
FIG. 6 is a diagram illustrating cancellation of a sixth harmonic by the addition of a three-phase two-system current.

FIG. 6 illustrates γ axis currents $i_{\gamma 1}$ and $i_{\gamma 2}$ of the two systems and the average value thereof. It is assumed that the values of the zeroth components of the γ axis currents of the two systems are the same, and the amplitudes of the sixth components of the γ axis currents of the two systems are the same.

Regarding the sixth component whose one cycle corresponds to an electrical angle of 60°, the γ axis currents $i_{\gamma 1}$ and $i_{\gamma 2}$ of the two systems whose phases are displaced from each other at an electrical angle of 30° become antiphase in which the peak and the valley are reversed. Hence, adding the γ axis currents $i_{\gamma 1}$ and $i_{\gamma 2}$ having antiphase mutually cancels the sixth harmonic components thereof.

It is noted that, in reality, the values of the zeroth component of the γ axis current of the systems or the amplitudes of the sixth harmonic component of the γ axis current of the system may have slight errors due to, for example, errors of components such as windings or assembling errors of the systems. Also in this case, it can be considered that adding valued of the two systems substantially cancels the sixth harmonic component.

As described based on FIG. 1, the motor control apparatus 101 of the present embodiment estimates the extended induced voltage $e_{\gamma\delta}$ and the reference magnetic pole position $\theta\gamma$ by using the average value $v^*_{\gamma\delta}$ of the γδ axes voltage command value $v^*_{\gamma\delta 1}$ and $v^*_{\gamma\delta 2}$ and the average value $i_{\gamma\delta}$ of the γδ axes current detection values $i_{\gamma\delta 1}$ and $i_{\gamma\delta 2}$.

According to the present embodiment, by using the voltage value and the current value, whose fundamental wave components becomes the DC amount, in the estimated rotating coordinate system, discretization errors are eliminated, and position estimation can be performed with high accuracy even during high speed rotation.

In addition, by estimating the reference magnetic pole position $\theta\gamma$ by using the average values $v^*_{\gamma\delta 1}$ and $i_{\gamma\delta}$, of the voltage and the current of the systems, the harmonic components can be cancelled effectively compared with a configuration estimating the magnetic pole position for each of the systems from the voltage and the current. Thus, the accuracy in estimating a position can be improved while reducing a pulsation component of the magnetic pole position $\theta\gamma$.

In Japanese Patent No. 5527025, the extended induced voltage and the estimated phase angle are individually calculated by using the two inverters. In contrast, the induced voltage estimation section 57 of the present embodiment estimates the uniform extended induced voltage $e_{\gamma\delta}$ based on information common to the systems. Then, the magnetic pole position estimation section 58 estimates a magnetic pole position based on the uniform induced voltage $e_{\gamma\delta}$ estimated by the induced voltage estimation section 57.

Thus, according to the present embodiment, harmonic components can be appropriately reduced while the amount of calculation of the position estimation is reduced.

Second Embodiment

A three phase and two system motor control apparatus according to the second embodiment will be described with reference to FIG. 7.

Figure 7:
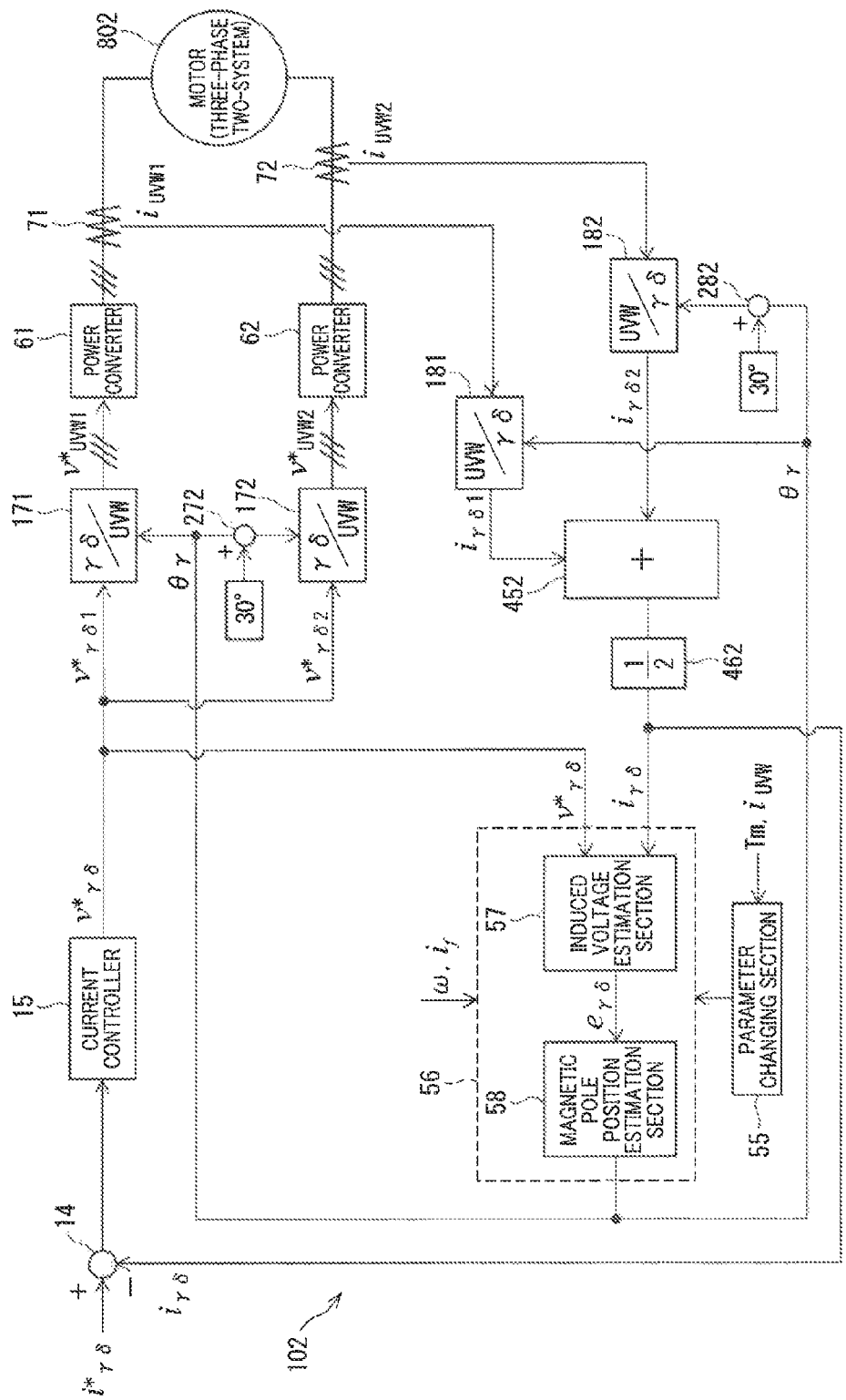
FIG. 7 is a control block diagram showing a configuration of a control apparatus for a rotating machine according to a second embodiment.

A motor control apparatus 102 shown in FIG. 7 includes, in addition to the configuration of the motor control apparatus 101 shown in FIG. 1, a current subtracter 14 and a current controller 15 are further provided as a configuration for current feedback control. The average value $i_{\gamma\delta}$ of the γδ axes currents calculated by the divider 462 are obtained by the induced voltage estimation section 57, and is fed back to a γδ axes current command value $i^*_{\gamma\delta}$ common to the two systems. Then, the difference between the average value $i_{\gamma\delta}$ and the γδ axes current command value $i^*_{\gamma\delta}$ is calculated by the current subtracter 14.

The current controller 15 calculates γδ axes voltage command values $V^*_{\gamma\delta}$ common to the two systems by PI control or the like so that the difference between the current command value $i^*_{\gamma\delta}$ and a feedback current $i_{\gamma\delta}$ converges to 0. In principle, values $V^*_{\delta1}$ and $V^*_{\delta2}$, which are the same as the γδ axes voltage command value $V^*_{\gamma\delta}$, are respectively issued to the power converters 61 and 62 of the first system and the second system.

In addition, the γδ axes voltage command values $V^*_{\gamma\delta}$ are directly obtained by the induced voltage estimation section 57. That is, in the second embodiment, a voltage adder serving as a harmonic component cancellation section is not provided. In this manner, the harmonic component cancellation section may be provided so as to perform the cancellation process for at least one of the voltage and the current of each of the systems.

In the motor control apparatus 102 of the second embodiment, the average value $i_{\gamma\delta}$ of the γδ axes currents $i_{\gamma\delta1}$ and $i_{\gamma\delta2}$ of the two systems are used as a feedback current of the current feedback control.

According to a configuration of a comparative example of the above case, the γδ axes currents $i_{\gamma\delta1}$ and $i_{\gamma\delta2}$ of the systems are directly fed back to current command values of the systems. In this case, due to the influence of harmonic components superimposed on currents of the systems, pulsation may be caused in output voltage calculated by the current controller 15. In addition, since feedback calculation is performed for each of the systems, the amount of calculation increases, According to the second embodiment, the accuracy in position estimation can be improved as in the case of the first embodiment. In addition, compared to the configuration of the comparative example, harmonic components superimposed on a feedback current can be effectively removed by simple calculation without using a filter and the like. Thus, pulsation in output voltage caused by the current feedback control can be suppressed. In addition, since the common feedback calculation is performed for each of the systems, the amount of calculation can be reduced.

Third Embodiment

A three phase and three system motor control apparatus according to the third embodiment will be described with reference to FIG. 8, FIG. 9, and FIG. 10 respectively corresponding to FIG. 1, FIG. 3, and FIG. 6 of the first embodiment.

Figure 8:
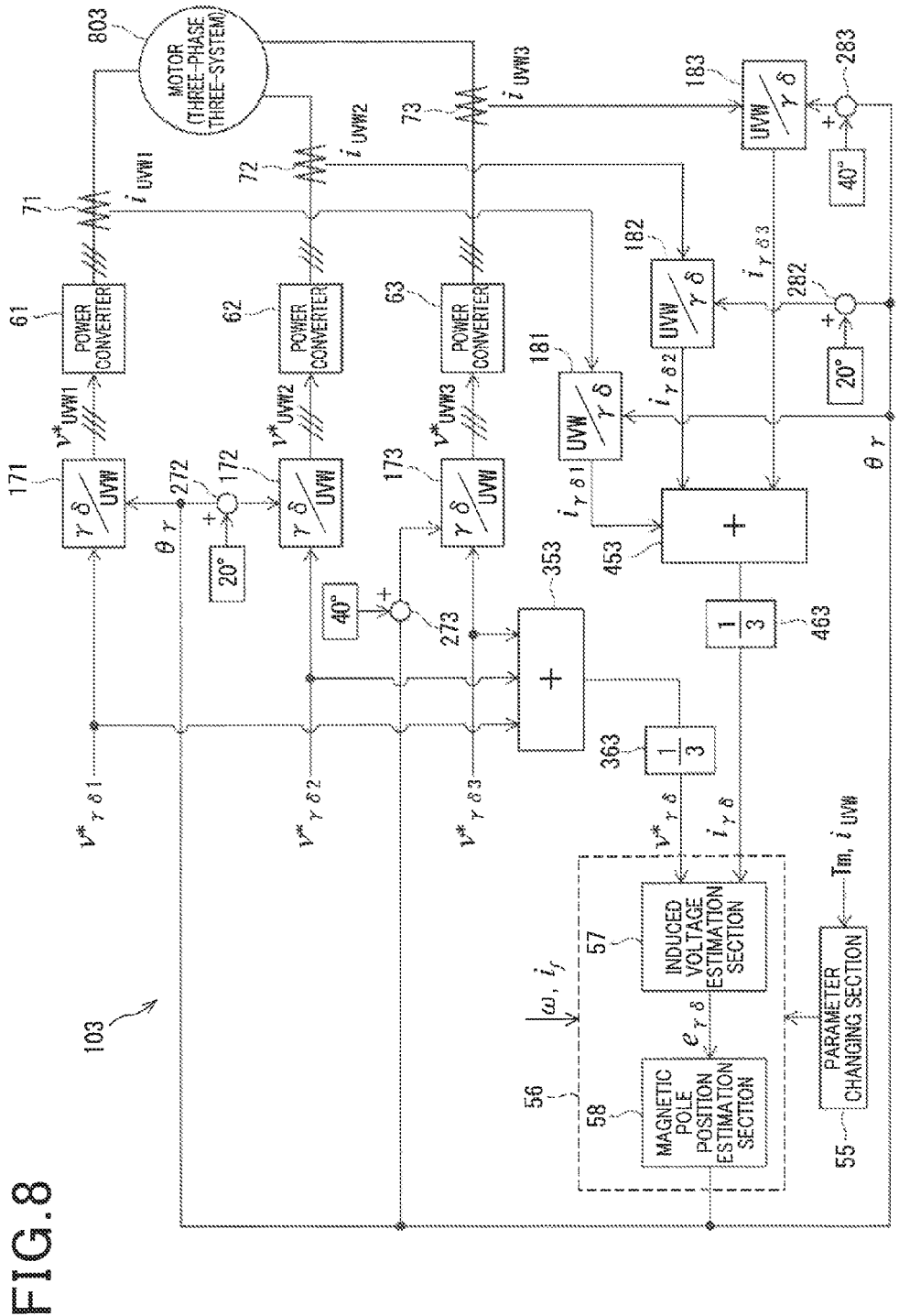
FIG. 8 is a control block diagram showing a configuration of a control apparatus for a rotating machine according to a third embodiment.

As shown in FIG. 8, a motor control apparatus 103 is applied to a system in which AC power is supplied from three power converters 61, 62, and 63 to a motor 803 having groups of three-phase windings of three systems (three groups of three-phase windings).

Figure 9:
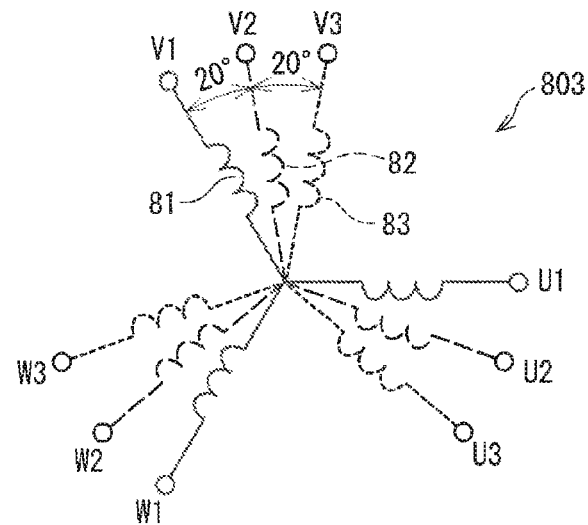
FIG. 9 is a schematic diagram of windings of a three-phase three-system rotating machine.

FIG. 9 shows the first system winding 81 with a solid line, the second system winding 82 with a broken line, and a third system winding 83 with a fine broken line to schematically show an arrangement of the windings of the three-phase and three-system motor 803. Phases of the phase windings of the three-phase and three-system motor 803 between the first system and the second system and between the second system and the third system are displaced from each other at an electrical angle of 20 (i.e. 60/3)°.

The motor control apparatus 103 includes, in addition to the configuration of the motor control apparatus 101 of the first embodiment, a two-phase three-phase converter 173 and a three-phase two-phase converter 183 of the third system. The two-phase three-phase converter 173 of the third system converts a γδ axes voltage command value $v^*_{\gamma\delta3}$ to a three-phase voltage command value $v^*_{UVW3}$ and outputs the three-phase voltage command value $v^*_{UVW3}$ to the power converter 63. The three-phase two-phase converter 183 of the third system obtains a phase current $i_{UVW3}$ of the third system detected by a current sensor 73 and converts the phase currents $i_{UVW3}$ to a γδ axes current detection value $i_{\gamma\delta3}$.

The voltage adder 353 calculates the sum of the γδ axes voltage command values $v^*_{\gamma\delta1}$, $v^*_{\gamma\delta2}$, and $v^*_{\gamma\delta3}$ of the three systems. The divider 363 outputs an average value obtained by dividing the sum by 3 to the induced voltage estimation section 57.

The current adder 453 calculates the sum of the γδ axes current detection values $i_{\gamma\delta1}$, $i_{\gamma\delta2}$, and $i_{\gamma\delta3}$ of the three systems. The divider 463 outputs an average value obtained by dividing the sum by 3 to the induced voltage estimation section 57.

Matters concerning parameter setting by the parameter changing section 55 and estimation calculation by the estimation section 56 are the same as those of the first embodiment.

The reference magnetic pole position θγ estimated by the magnetic pole position estimation section 58 is transmitted to the two-phase three-phase converters 171, 172, 173 and the three-phase two-phase converters 181, 182, 183.

At this time, the two-phase three-phase converters 171 and the three-phase two-phase converter 181 of the first system receive the reference magnetic pole position θγ. The two-phase three-phase converter 172 and the three-phase two-phase converter 182 of the second system receive information on a position obtained by adding an electrical angle of 20° to the reference magnetic pole position θγ by the angle adders 272, 282. The two-phase three-phase converter 173 and the three-phase two-phase converter 183 of the third system receive information on a position obtained by adding an electrical angle of 40° to the reference magnetic pole position θγ by angle adders 273, 283.

The γδ axes currents $i_{\gamma\delta1}$, $i_{\gamma\delta2}$, and $i_{\gamma\delta3}$ of the three systems in which the sixth harmonic component is superimposed on the zeroth component are expressed by the expression 9.

$$\begin{bmatrix} i_{\gamma1} \\ i_{\delta1} \end{bmatrix} = \begin{bmatrix} i_{\gamma1\_0th} + |i_{\gamma1\_6th}|\sin6(\theta + \theta_{\gamma1}) \\ i_{\delta1\_0th} + |i_{\delta1\_6th}|\cos6(\theta + \theta_{\delta1}) \end{bmatrix} \quad \text{[Expression 9]}$$

$$\begin{bmatrix} i_{\gamma2} \\ i_{\delta2} \end{bmatrix} = \begin{bmatrix} i_{\gamma2\_0th} + |i_{\gamma2\_6th}|\sin6\left(\theta + \theta_{\gamma2} + \frac{\pi}{9}\right) \\ i_{\delta2\_0th} + |i_{\delta2\_6th}|\cos6\left(\theta + \theta_{\delta2} + \frac{\pi}{9}\right) \end{bmatrix}$$

$$\begin{bmatrix} i_{\gamma3} \\ i_{\delta3} \end{bmatrix} = \begin{bmatrix} i_{\gamma3\_0th} + |i_{\gamma3\_6th}|\sin6\left(\theta + \theta_{\gamma3} + \frac{2\pi}{9}\right) \\ i_{\delta3\_0th} + |i_{\delta3\_6th}|\cos6\left(\theta + \theta_{\delta3} + 2\frac{\pi}{9}\right) \end{bmatrix}$$

Figure 10:
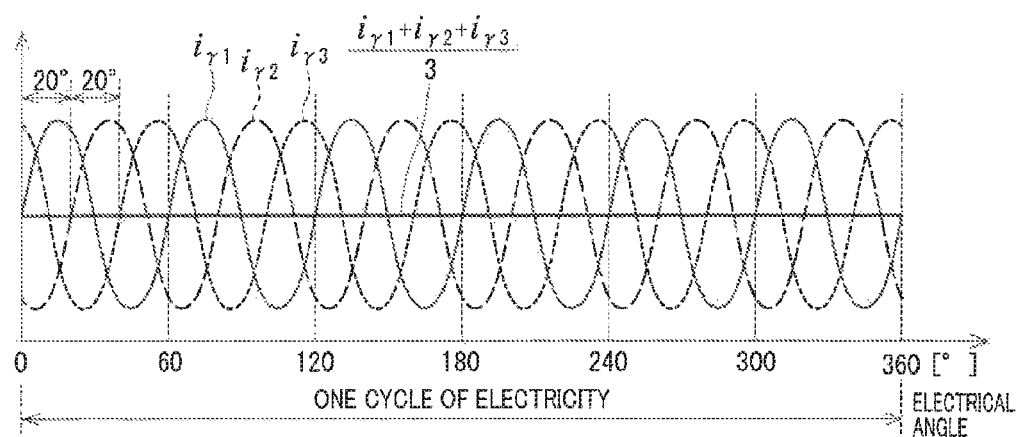
FIG. 10 is a diagram illustrating cancellation of a sixth harmonic by the addition of a three-phase three-system current.

FIG. 10 illustrates γ axis currents $i_{\gamma1}$, $i_{\gamma2}$, and $i_{\gamma3}$ of the three systems and the average value thereof. It is assumed that the zeroth components of the γ axis currents of the systems are the same. Adding the γ axis currents $i_{\gamma1}$, $i_{\gamma2}$, and $i_{\gamma3}$, between which phases are displaced from each other at an electrical angle of 20°, mutually cancels the sixth harmonic components thereof.

The motor control apparatus 103 estimates the extended induced voltage $e_{\gamma\delta}$ and the reference magnetic pole position θγ by using the average value $v^*_{\gamma\delta}$ of the γδ axes voltage command values $v^*_{\gamma\delta 1}$, $v^*_{\gamma\delta 2}$, and $v^*_{\gamma\delta 3}$ of the three systems and the average value $i_{\gamma\delta}$ of the γδ axes current detection values $i_{\gamma\delta 1}$, $i_{\gamma\delta 2}$, and $i_{\gamma\delta 3}$. Thus, the influence of the sixth harmonic component in the estimation calculation can be eliminated to improve the accuracy in estimating the position.

Fourth Embodiment

Figure 11:
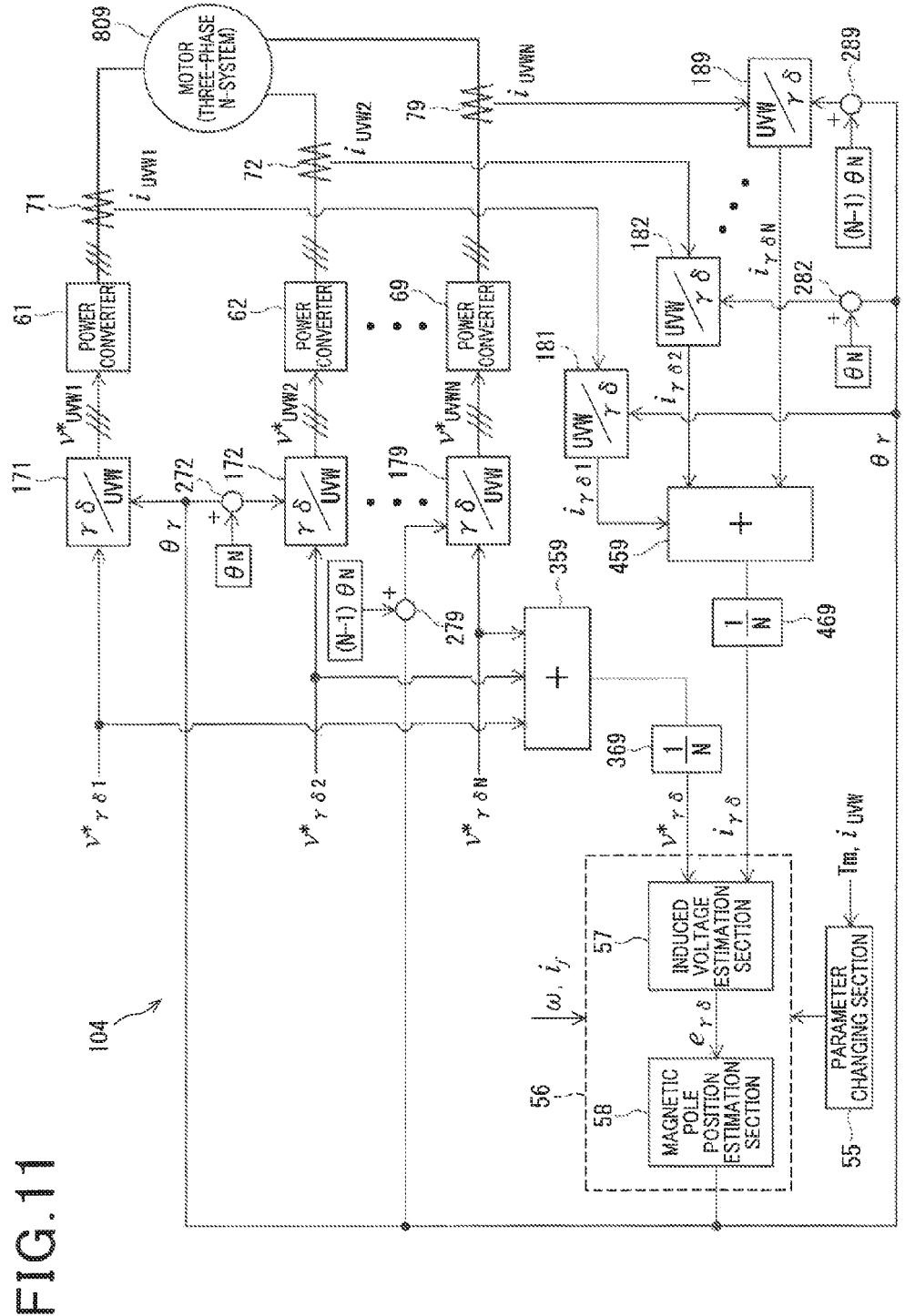
FIG. 11 is a control block diagram showing a configuration of a control apparatus for a rotating machine according to a fourth embodiment.

A three phase and N system motor control apparatus according to the fourth embodiment will be described with reference to FIG. 1 of the first embodiment and FIG. 11 corresponding to FIG. 8 of the third embodiment. In FIG. 11, the first system, the second system, and the Nth system are shown, and one or more systems between the second system and the Nth system are not shown. That is, N is an integer of 4 or more.

The motor control apparatus 104 is applied to a system in which AC power is supplied from N power converters 61, 62, ..., 69 to a motor 809 having three-phase windings of N systems. As analogized from the examples of two systems and three systems of the first and third embodiments, phases of the groups of the windings of the three-phase and N-system motor 809 between the systems are displaced from each other at an electrical angle of (60/N)°. When $\theta_N=(60/N)°$, the phase of the Nth system is displaced by $(N-1)\theta_N$ from the phase of the first system.

The motor control apparatus 104 includes two-phase three-phase converters 171, 172, ..., 179 and three-phase two-phase converters 181, 182, ..., 189. The two-phase three-phase converter 179 of the Nth system converts a γδ axes voltage command value $v^*_{\gamma\delta N}$ to a three-phase voltage command value $v^*_{UVWN}$ and outputs the three-phase voltage command value $v^*_{UVWN}$ to the power converter 69. The three-phase two-phase converter 189 of the Nth system obtains a phase current $i_{UVWN}$ of the Nth system detected by current sensor 79 and converts the phase current $i_{UVWN}$ to a γδ axes current detection value $i_{\gamma\delta N}$.

A voltage adder 359 calculates the sum of the γδ axes voltage command values $v^*_{\gamma\delta 1}$, $v^*_{\gamma\delta 2}$, ..., and $v^*_{\gamma\delta N}$ of the N systems. A divider 362 outputs an average value obtained by dividing the sum by N to the induced voltage estimation section 57.

A current adder 459 calculates the sum of the γδ axes current detection values $i_{\gamma\delta 1}$, $i_{\gamma\delta 2}$, ..., $i_{\gamma\delta N}$ of the N systems. A divider 469 outputs an average value $i_{\gamma\delta}$ obtained by dividing the sum by N to the induced voltage estimation section 57.

Matters concerning parameter setting by the parameter changing section 55 and estimation calculation by the estimation section 56 are the same as those of the above embodiment.

The reference magnetic pole position θγ calculated by the magnetic pole position estimation section 58 is transmitted to the two-phase three-phase converters 171, 172, ..., 179 and the three-phase two-phase converters 181, 182, ..., 189 of the systems. At this time, the two-phase three-phase converter 179 and the three-phase two-phase converter 189 of the Nth system receive information on a position obtained by adding an electrical angle $(N-1)\theta_N$ to the reference magnetic pole position θγ by the angle adders 279, 289.

As described above, the present embodiment can be applied to an Nth or more system motor control apparatus.

Other Embodiments (a) In the above, the cancellation process in which the sixth component in the estimated rotating coordinate system is mainly canceled in the three-phase rotating machine. However, the harmonic component subjected to the cancellation process is not limited to the sixth component. For example, as analogized from FIG. 6, the two system motor control apparatuses 101, 102 can reduce, in addition to a sixth component, for example, eighteenth and thirtieth components. In addition, as analogized from FIG. 10, the three system motor control apparatus 103 can reduce, in addition to a sixth component, for example, twelfth and twenty-fourth components.

(b) The rotating machine to be controlled of the present invention is not limited to a three-phase rotating machine and may be an M-phase (four-phase or more) rotating machine. That is, if N is an integer of 2 or more, and M is an integer of 3 or more, the present invention can be typically applied to a control apparatus for an M-phase and N system rotating machine.

It will be appreciated that the present invention is not limited to the configurations described above, but any and all modifications, variations or equivalents, which may occur to those who are skilled in the art, should be considered to fail within the scope of the present invention.

Hereinafter, an aspect of the above-described embodiments will be summarized.

The control apparatus for a rotating machine according to the embodiment controls the rotating machine (802, 803, 809) that includes a stator (84) having a plurality of groups of three phases or more multiple phase windings, to control current application to the groups of windings by using sensorless position control. The control apparatus includes a plurality of power converters (61, 62, 63, 69), a harmonic component cancellation section (352, 452, 353, 453, 359, 459), an induced voltage estimation section (57), and a magnetic pole position estimation section (58).

The plurality of power converters convert received electric power to AC power and supply the AC power to the rotating machine.

The harmonic component cancellation section reduces a harmonic component superimposed on a fundamental wave component by a cancellation process in an estimated rotating coordinate system for at least one of a voltage and a current of each system, when a unit of a group of components controlling current application to a specific group of the windings is defined as a system.

The induced voltage estimation section estimates an induced voltage based on information common to the systems including a voltage value and a current value calculated by the cancellation process.

The magnetic pole position estimation section estimates a magnetic pole position of a rotor (85) of the rotating machine based on the induced voltage estimated by the induced voltage estimation section.

Typically, the harmonic component, cancellation section includes, as the cancellation process, at least one of a voltage adder (352, 353, 359) that adds voltage command values in the estimated rotating coordinate system of the systems and a current adder (452, 453, 459) that adds current detection values in the estimated rotating coordinate system of the systems.

In the embodiment, the harmonic component cancellation section performs the cancellation process to reduce harmonic components that affect the accuracy in position estimation.

In Japanese Patent No. 5527025, the extended induced voltage and the estimated phase angle are individually calculated by using the two inverters. In contrast, the induced voltage estimation section of the present embodiment estimates the uniform induced voltage based on information common to the systems. Then, the magnetic pole position estimation section estimates the magnetic pole position based on the uniform induced voltage estimated by the induced voltage estimation section.

Thus, according to the present embodiment, harmonic components can be appropriately reduced while the amount of calculation of position estimation is reduced.

The control apparatus for a rotating machine preferably performs current feedback control by using a current having been subjected to the cancellation process of the harmonic component cancellation section. Hence, harmonic components included in a feedback current can be appropriately reduced in current feedback control. In addition, a filter for reducing the harmonic components is not needed.

What is claimed is:

1. A control apparatus for a rotating machine, the control apparatus controlling the rotating machine that includes a stator having a plurality of groups of three phases or more multiple phase windings, to control current application to the groups of windings by using sensorless position control, the control apparatus comprising:
    a plurality of power converters that convert received electric power to AC power and supply the AC power to the rotating machine;
    a harmonic component cancellation section that reduces a harmonic component superimposed on a fundamental wave component by a cancellation process in an estimated rotating coordinate system for at least one of a voltage and a current of each system, when a unit of a group of components controlling current application to a specific group of the windings is defined as a system;
    an induced voltage estimation section that estimates an induced voltage based on information common to the systems including a voltage value and a current value calculated by the cancellation process; and
    a magnetic pole position estimation section that estimates a magnetic pole position of a rotor of the rotating machine based on the induced voltage estimated by the induced voltage estimation section.

2. The control apparatus for a rotating machine according to claim 1, wherein
    the harmonic component cancellation section includes, as the cancellation process, at least one of a voltage adder that adds voltage command values in the estimated rotating coordinate system of the systems and a current adder that adds current detection values in the estimated rotating coordinate system of the systems.

3. The control apparatus for a rotating machine according to claim 1, wherein
    the induced voltage estimation section and the magnetic pole position estimation section perform estimation calculation by using the number of rotations of the rotating machine, and, as parameters of the rotating machine, resistance, self inductance, and mutual inductance.

4. The control apparatus for a rotating machine according to claim 3, further comprising a parameter changing section that changes a value of the parameter of the rotating machine depending on an operating state of the rotating machine.

5. The control apparatus for a rotating machine according to claim 1, wherein the control apparatus performs current feedback control by using the current having been subjected to the cancellation process of the harmonic component cancellation section.

* * * * *